United States Patent [19]

Lürkens

[11] Patent Number: 5,410,203

[45] Date of Patent: Apr. 25, 1995

[54] RELUCTANCE MOTOR WITH YOKE SATURATION

[75] Inventor: Peter Lürkens, Aachen, Germany

[73] Assignee: U.S. Philips Corporation, New York, N.Y.

[21] Appl. No.: 201,847

[22] Filed: Feb. 25, 1994

[30] Foreign Application Priority Data

Mar. 4, 1993 [DE] Germany .......... 43 06 726.3

[51] Int. Cl.6 .................................. H02K 19/06
[52] U.S. Cl. ................... 310/163; 310/166; 310/168; 310/269; 318/701
[58] Field of Search .......... 318/701; 310/163, 155, 310/106, 269, 168, 162, 166

[56] References Cited

U.S. PATENT DOCUMENTS

| | | | |
|---|---|---|---|
| 3,062,979 | 11/1962 | Jarret et al. | 310/168 |
| 4,489,262 | 12/1984 | Moren et al. | 310/168 |
| 4,506,182 | 3/1985 | Rohdin | 310/269 |
| 4,795,953 | 1/1989 | Compter et al. | 318/701 |
| 4,948,999 | 8/1990 | Bertram et al. | 310/162 |
| 5,084,663 | 1/1992 | Olsson | 318/701 |
| 5,168,203 | 12/1992 | Tepavcvic | 318/701 |

FOREIGN PATENT DOCUMENTS 3215376 12/1982 Germany .
3640609 6/1988 Germany .

Primary Examiner—R. Skudy
Attorney, Agent, or Firm—Edward Blocker

[57] ABSTRACT

The invention relates to a reluctance motor having a ferromagnetic stationary member (3) and a ferromagnetic member (5) which is movable relative thereto, which exhibit an air gap (4) between spaced-apart pole faces (3c, 5c) of salient pole parts (3b, 5b), one of the members being provided with excitation coils, which surround ferromagnetic cores (3a, 5a) providing a ferromagnetic coupling between the pole parts of this member, the ferromagnetic cores being dimensioned to have such cross-sections that during the magnetisation of these cores by the excitation current the cores are magnetically saturated at the same time as the salient pole parts.

3 Claims, 2 Drawing Sheets

RELUCTANCE MOTOR WITH YOKE SATURATION

BACKGROUND OF THE INVENTION

1. Field of the Invention

The invention relates to a reluctance motor having a ferromagnetic stationary member and a ferromagnetic member which is movable relative thereto, which exhibit an air gap between spaced-apart pole faces of salient pole parts, one of the members being provided with excitation coils, which surround ferromagnetic cores providing a ferromagnetic coupling between the pole parts of said one member.

2. Description of the Related Art

Reluctance motors basically comprise a stationary ferromagnetic member, generally provided with excitation coils, and a movable member capable of rotation in an air gap or capable of translation. In the case of a single-phase reluctance motor the stationary ferromagnetic member (stator) has two radially aligned pole teeth at the air gap. The ferromagnetic movable member (the rotor) also has two diametrally spaced pole teeth. The ferromagnetic materials of the rotor and the stator are readily magnetisable up to a given maximum induction, i.e. the saturation induction, the induction in the material increasing rapidly in response to an increasing current in the electrical windings until saturation begins, after which it increases only slightly.

The excitation of the electrical winding produces a magnetic flux in the stationary member and in the movable member. The magnitude of this flux depends basically on the position of the rotor relative to the stator and on the current intensity. The dependence on the position is caused by the fact that with their salient pole parts, i.e. the teeth, the rotor, the stator or both make the air gap between the stator and the rotor larger or smaller depending on the rotor position, as a result of which the transfer of flux from the stator to the rotor decreases or increases.

If the magnetic flux is to be varied electrically a voltage U should be applied to the motor for a given time. The time integral of this voltage is equal to the flux variation multiplied by the number of turns of the stator winding. The product of the magnetic flux and the number of turns is referred to as the flux linkage $\Psi$. If the relevant materials are linear the stator current I and the flux linkage $\Psi$ will be proportional, the inductance $L_1$ or $L_2$ being the proportionality constant. If the materials are non-linear and, in particular, have saturation properties the relationship between I and $\Psi$ can be linearised at least in small steps. The ratio $\Delta\Psi/\Delta I$ is then referred to as the differential inductance. The inductance dictates the voltage required in order to obtain a current variation $\Delta I$ and hence a flux variation $\Delta\Psi$ in a given time $\Delta T$.

The operation of reluctance motors may be described in terms of a cyclic process. This process can be illustrated by means of a flux linkage versus current diagram ($\Psi$-I diagram). FIG. 1 shows such a diagram, which is typical of a prior art reluctance motor, for non-saturated operation in a normalised and diagrammatic form, i.e. all the variations are approximated to by line segments, the maximum values for I and $\Psi$ having the numerical values 1. The magnetic saturation is not shown.

If a voltage U is applied to the motor, starting from the voltageless and currentless condition (point 0, 0) in the $\Psi$-I diagram shown in FIG. 1, the current in the motor as well as the flux linkage $\Psi$ will gradually increase with the time t. The following equation is then valid:

$$\frac{d\psi}{dt} = U \quad (1)$$

The operating point of the motor in the $\Psi$-I diagram shown in FIG. 1 now moves to the right along a straight line $\Psi = L_1 \cdot I$, representing the characteristic I. The motor then consumes energy. The energy consumption is:

$$W = \int_0^T U \cdot I dt = \int_0^T \frac{d\psi}{dt} I dt = \int_0^\psi I d\psi \quad (2)$$

This geometrically represents the area between the line $\Psi = L_1 \cdot I$ (characteristic I) and the $\Psi$ axis of the diagram.

A basic feature of such a reluctance motor is that the flux linkage of the motor depends on the rotor position. Such a motor is defined by two marked positions, i.e. the positions in which for a given current the flux linkage is a minimum (point $\Psi_1$, $I_1$) at the right-hand end of the characteristic I and a maximum (point $\Psi_2$, $I_1$) at the right-hand end of the characteristic II. If the rotor is initially in the position defined by the point $\Psi_1$, $I_1$ the motor condition gradually changes from the end of the characteristic I at the point $\Psi_1$, $I_1$ to the right-hand end of the characteristic II at the point $\Psi_2$, $I_1$ when the rotor rotates at a constant current. The electric power consumption of the motor then corresponds to the area of the hatched rectangle. During rotation of the motor this results in a voltage on the motor terminals, whose time integral at the end of the rotation corresponds to the difference of the flux linkages $\Psi_1$ and $\Psi_2$. If the current in the motor is now reduced to zero the motor condition returns to the left to the origin 0, 0 of the diagram along the characteristic II. The energy corresponding to the area between the characteristic II and the $\Psi$ axis is then returned to the source. The energy balance shows that the electric power applied to the motor corresponds to the area of the triangle (0, 0)-($\Psi_1$, $I_1$)-($\Psi_2$, $I_1$) which is followed in the cyclic process. During rotation the motor has supplied this power to the shaft as mechanical energy. For a successful construction of a reluctance motor this energy should be a high as possible.

A problem which then occurs is that the transition between the characteristics I and II occurs continually when the motor rotates permanently. In order to prevent that a change-over to the respective other characteristic occurs already during the transition (0, 0)-($\Psi_1$, $I_1$) or ($\Psi_2$, $I_1$)-(0, 0) the transitions should be as short as possible, i.e. the flux-linkage differences $0 \rightarrow \Psi_1$ and $\Psi_2 \rightarrow 0$ should be built up within a minimal time. Thus, the path around the area marked with crosses will be situated as far as possible to the outside, which means that the enclosed area becomes as large as possible. However, it is almost impossible to realise this ideal path because the rapid build-up and decay of the flux linkages requires high voltages of short duration. However, the magnitude of the voltage which can be applied to the motor is limited by the electronic power supply. Particularly the transition $\Psi_2 \rightarrow 0$ is difficult because it requires the decay of a particularly large flux linkage, i.e. $\Psi_2$.

For the practical operation of a reluctance motor it is important to minimise the flux-linkage differences produced during magnetisation and demagnetisation.

When the $\Psi$-I diagram is studied it appears that for a given maximum flux linkage and a given maximum current a triangular $\Psi$-I diagram does not utilise the available area to an optimum extent. The area is utilised better if a rectangular shape of the characteristics can be obtained. This can be achieved by approximation through the use of the saturation of magnetic materials. Thus, it is accomplished that above a given flux linkage $\Psi_3$ this flux linkage increases only slowly. The degree of flattening in the saturated range is then determined by the path-length of the magnetic field lines in the saturated part of the material. This yields a diagram as shown in FIG. 3. This customary method is currently applied to reluctance motors whose rotor and/or stator teeth are designed to have this property. However, this can be realised only to a limited extent or as a rough approximation.

SUMMARY OF THE INVENTION

It is an object of the invention to provide a reluctance motor of the type defined in the opening paragraph with an improved motor efficiency.

According to the invention this object is achieved in that the ferromagnetic cores are dimensioned to have such cross-sections that during the magnetisation of said cores by the excitation current the cores are magnetically saturated at the same time as the salient pole parts.

Thus, not only the rotor and stator teeth but also the yokes connecting the teeth are used as saturable elements of the motor. Since the material cross-section of the yokes is so small that the yokes can be magnetically saturated at the same time as the teeth this construction may be referred to as a motor with yoke saturation.

In general, the special yoke construction can be used effectively in particular in single-phase small-size reluctance motors. However, yoke saturation can also be used in polyphase reluctance motors if the magnetic-flux paths of the individual phases are separated. Saturation of the yokes is possible in the rotor, in the stator and also in both parts.

Yoke saturation is particularly suitable for reluctance motors of small dimensions. With such motors it is difficult to obtain a large ratio between the inductances in the positions I and II. With the customary construction only the length of the teeth is available for the purpose of using a saturation effect in order to improve the utilisation of the $\Psi$-I diagram. This length is often considerably smaller than the length of the yokes.

The invention will now be described in more detail with reference to the drawings. In the drawings:

DESCRIPTION OF THE PREFERRED EMBODIMENT

Figure 2:
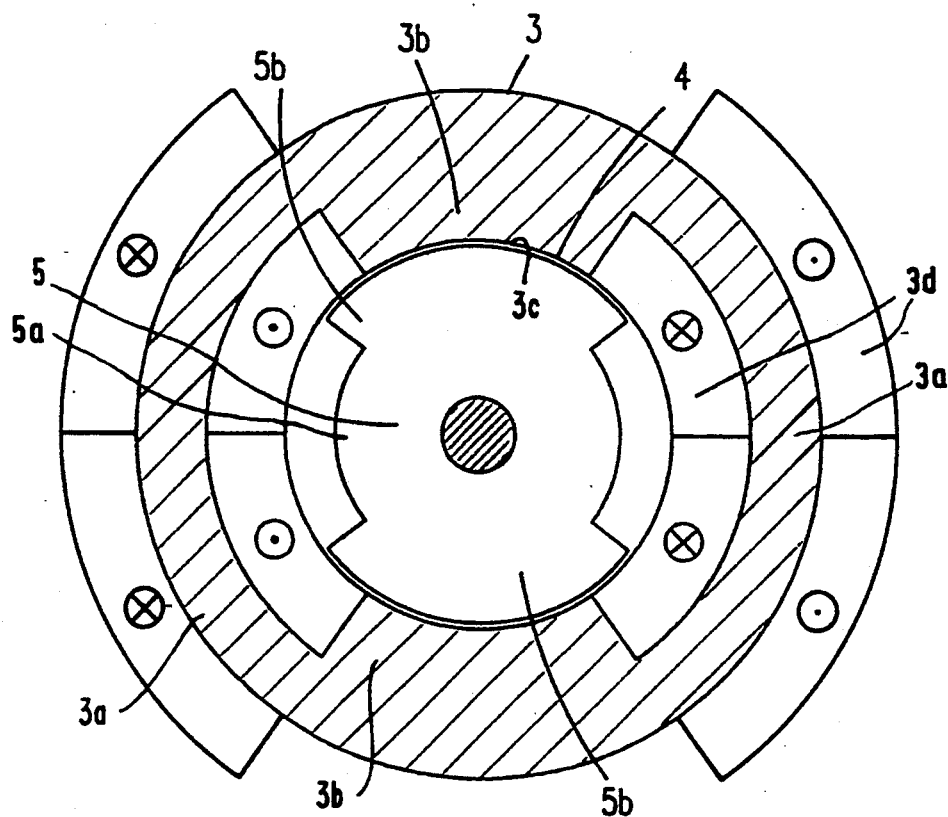
FIG. 2 shows a single-phase reluctance motor.

FIG. 2 is a sectional view of a single-phase reluctance motor. The motor has a ferromagnetic stator 3. This stator 3 comprises yokes 3a, which connect the stator teeth 3b and operate as cores. The pole faces 3c of the stator teeth 3b adjoin an air gap 4. The stator 3 is energised by means of windings 3d through which an excitation current flows.

A rotor 5 is capable of rotation in the air gap 4 and comprises a pole core 5a and radially opposed rotor teeth 5b.

Figure 1:
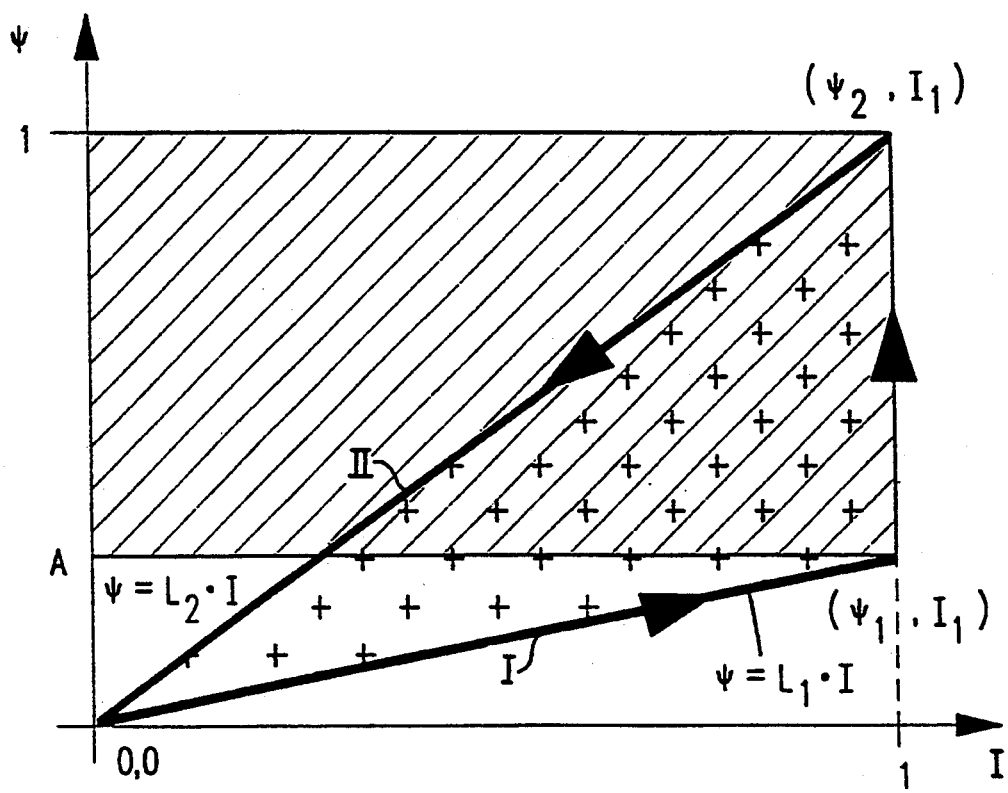
FIG. 1 is a $\Psi$-I diagram of a prior art reluctance motor in which there is saturation of none of the pole parts.
Figure 3:
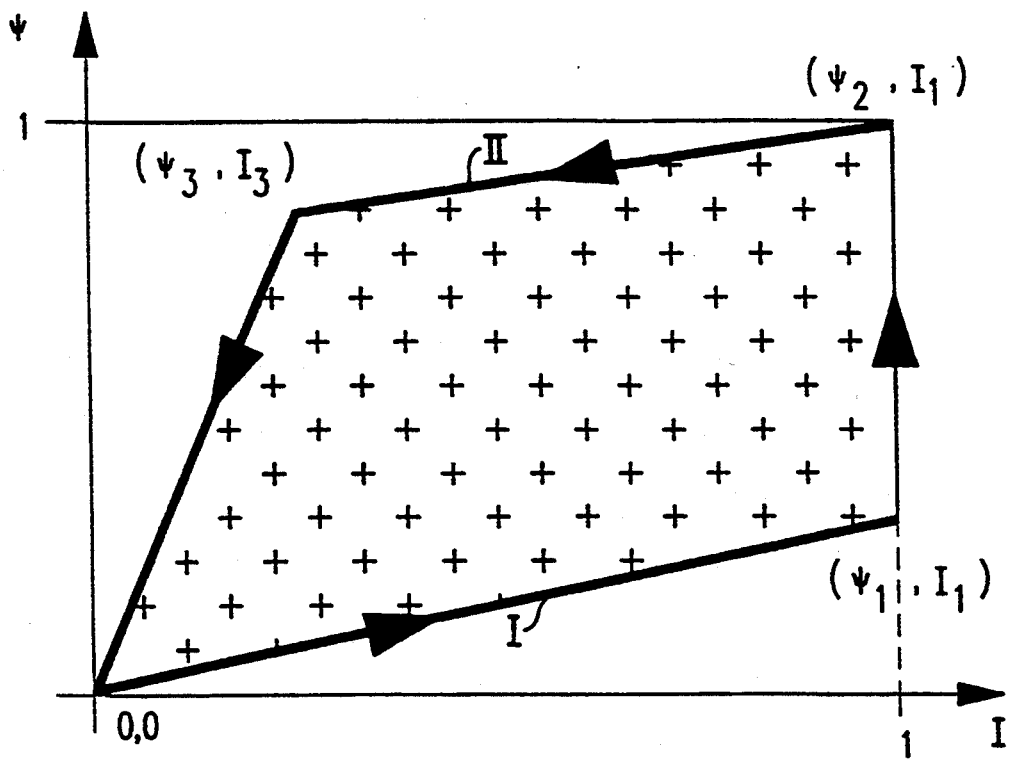
FIG. 3 is a $\Psi$-I diagram of the reluctance motor shown in FIG. 2 in the case of saturation of the teeth.

FIG. 3 shows a $\Psi$-I diagram, using the tooth saturation in accordance with the invention. In the same way as in FIG. 1 the current I and the flux linkage during magnetisation increase from the point 0, 0 to the point $(\Psi_1, I_1)$ in accordance with the characteristic I, after which they increase further to the point $(\Psi_2, I_1)$. During demagnetisation the current I and the flux linkage $\Psi$ follow the characteristic II. As a result of the saturation the characteristic II exhibits a break point $\Psi_3$, $I_3$. The characteristic between $(\Psi_2, I_1)$ and $(\Psi_3, I_3)$ is flatter than in FIG. 1 without tooth saturation in the case of exclusive saturation of the teeth.

Figure 4:
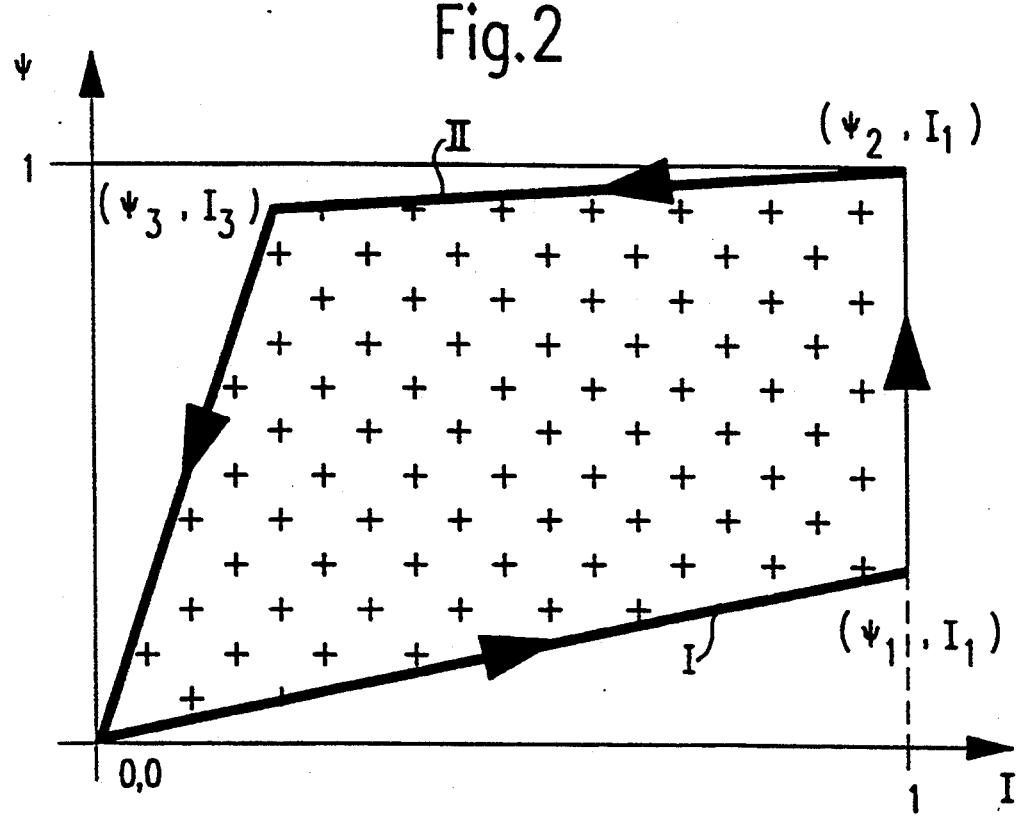
FIG. 4 is a $\Psi$-I diagram of the reluctance motor shown in FIG. 2 in the case of saturation of the teeth and the yoke.

FIG. 4 shows a $\Psi$-I diagram, for which in addition to the tooth saturation the yoke saturation in accordance with the invention is applied. In the same way as in FIGS. 1 and 3 the current I and the flux linkage during magnetisation increase from the point 0, 0 to the point $(\Psi_1, I_1)$ in accordance with the characteristic I, after which they increase further to the point $(\Psi_2, I_1)$. During demagnetisation the current I and the flux linkage $\Psi$ follow the characteristic II. As a result of the saturation the characteristic II exhibits a break point $\Psi_3$, $I_3$. The characteristic between $(\Psi_2, I_1)$ and $(\Psi_3, I_3)$ is flatter than in FIG. 3 without yoke saturation in the case of exclusive saturation of the teeth. The area marked with crosses in the diagram is now substantially larger, so that the power delivered to the shaft is also substantially larger than in the case of FIG. 1 and also than in the case FIG. 3.

Under the influence of the yoke saturation the upper part of the characteristic II can be substantially flatter than attainable in the case of exclusive saturation of the teeth. This is because the slopes of the characteristics are in general inversely proportional to the path-length in the saturated material. In the case of small motors and exclusive utilisation of the length of the pole teeth an excessive slope will be obtained in the saturation area. The length of the saturated path will only be adequate to provide a substantial reduction of the slope if the yokes are also dimensioned so as to be saturated simultaneously with the teeth.

I claim:

1. A reluctance motor having a ferromagnetic stationary member and a ferromagnetic movable member, the ferromagnetic stationary and movable members each comprising two salient pole parts and a core providing a magnetic flux path between the two salient pole parts, one of the members being provided with excitation coils for receiving an excitation current to generate magnetic flux, the salient pole parts of the members becoming momentarily aligned with each other during movement of the movable member so as to momentarily form a ferromagnetic coupling for the generated magnetic flux to flow through both members in a closed path, characterized in that the cores and salient pole parts are dimensioned to have such cross-sections that during the ferromagnetic coupling of the members the cores and the salient pole parts all become magnetically saturated at substantially a same time.

2. A reluctance motor as defined in claim 1 wherein the stationary member is provided with the excitation coils.

3. A reluctance motor as defined in claim 2 wherein the movable member is a rotor, the stationary member is a stator, the core of the stationary member is at least one yoke of the stator, and the salient pole parts are teeth of the rotor and stator.

* * * * *